United States Patent
Cross et al.

(10) Patent No.: US 11,281,213 B2
(45) Date of Patent: Mar. 22, 2022

(54) CONTROL OF AUTONOMOUS VEHICLES

(71) Applicant: BAE SYSTEMS plc, London (GB)

(72) Inventors: Gary Martin Cross, Bristol (GB); Mark Robert Goodall, Bristol (GB)

(73) Assignee: BAE SYSTEMS plc, London (GB)

( * ) Notice: Subject to any disclaimer, the term of this patent is extended or adjusted under 35 U.S.C. 154(b) by 191 days.

(21) Appl. No.: 16/344,223

(22) PCT Filed: Oct. 18, 2017

(86) PCT No.: PCT/GB2017/053148
§ 371 (c)(1),
(2) Date: Apr. 23, 2019

(87) PCT Pub. No.: WO2018/078335
PCT Pub. Date: May 3, 2018

(65) Prior Publication Data
US 2019/0243359 A1     Aug. 8, 2019

(30) Foreign Application Priority Data

Oct. 24, 2016   (EP) ..................................... 16275158
Oct. 24, 2016   (GB) ..................................... 1617915

(51) Int. Cl.
*G05D 1/00*     (2006.01)
*G05D 1/02*     (2020.01)

(52) U.S. Cl.
CPC ......... *G05D 1/0061* (2013.01); *G05D 1/0212* (2013.01); *G05D 1/0274* (2013.01)

(58) Field of Classification Search
CPC .. G05D 1/0061; G05D 1/0212; G05D 1/0274; G05D 1/0219; G05D 1/0088; E02F 9/2045
See application file for complete search history.

(56) References Cited

U.S. PATENT DOCUMENTS

| | | | | |
|---|---|---|---|---|
| 6,201,482 B1* | 3/2001 | Schiefele | ............... | G08G 5/006 340/961 |
| 2014/0156134 A1* | 6/2014 | Cullinane | .............. | B60K 37/06 701/23 |

(Continued)

FOREIGN PATENT DOCUMENTS

| EP | 3115272 A1 | 1/2017 |
|---|---|---|
| WO | 2018078335 A1 | 5/2018 |

OTHER PUBLICATIONS

International Search Report and Written Opinion received for PCT Application No. PCT/GB2017/053148, dated Jan. 3, 2018. 13 pages.

(Continued)

*Primary Examiner* — Rachid Bendidi
*Assistant Examiner* — Andrew J Cromer
(74) *Attorney, Agent, or Firm* — Finch & Maloney PLLC

(57) ABSTRACT

A system and method for controlling a vehicle (100), the vehicle (100) having an autonomous mode of operation, the system comprising: one or more sensors (102) configured to measure one or more parameters associated with an operator (110) controlling the vehicle (100) to perform a first operation; and one or more processors (106) configured to: determine that measurements taken by the one or more sensors (102) fulfil one or more predetermined criteria; responsive to determining that the measurements taken by the one or more sensors (102) fulfil the one or more predetermined criteria, determine a second operation for performance by the vehicle (100); and control the vehicle (100) in the autonomous mode such that the vehicle (100) performs the second operation.

16 Claims, 3 Drawing Sheets

(56) References Cited

U.S. PATENT DOCUMENTS

2016/0282878 A1\*  9/2016  Stratton ............... G05D 1/0219
2016/0355190 A1    12/2016  Omi
2017/0349186 A1\*  12/2017  Miller ................... B60W 40/08

OTHER PUBLICATIONS

GB Search Report under Section 17(5) received for GB Application No. 1617915.2 dated Apr. 25, 2017. 3 pages.
Extended European Search Report received for EP Application No. 16275158.0, dated Apr. 18, 2017. 8 pages.

\* cited by examiner

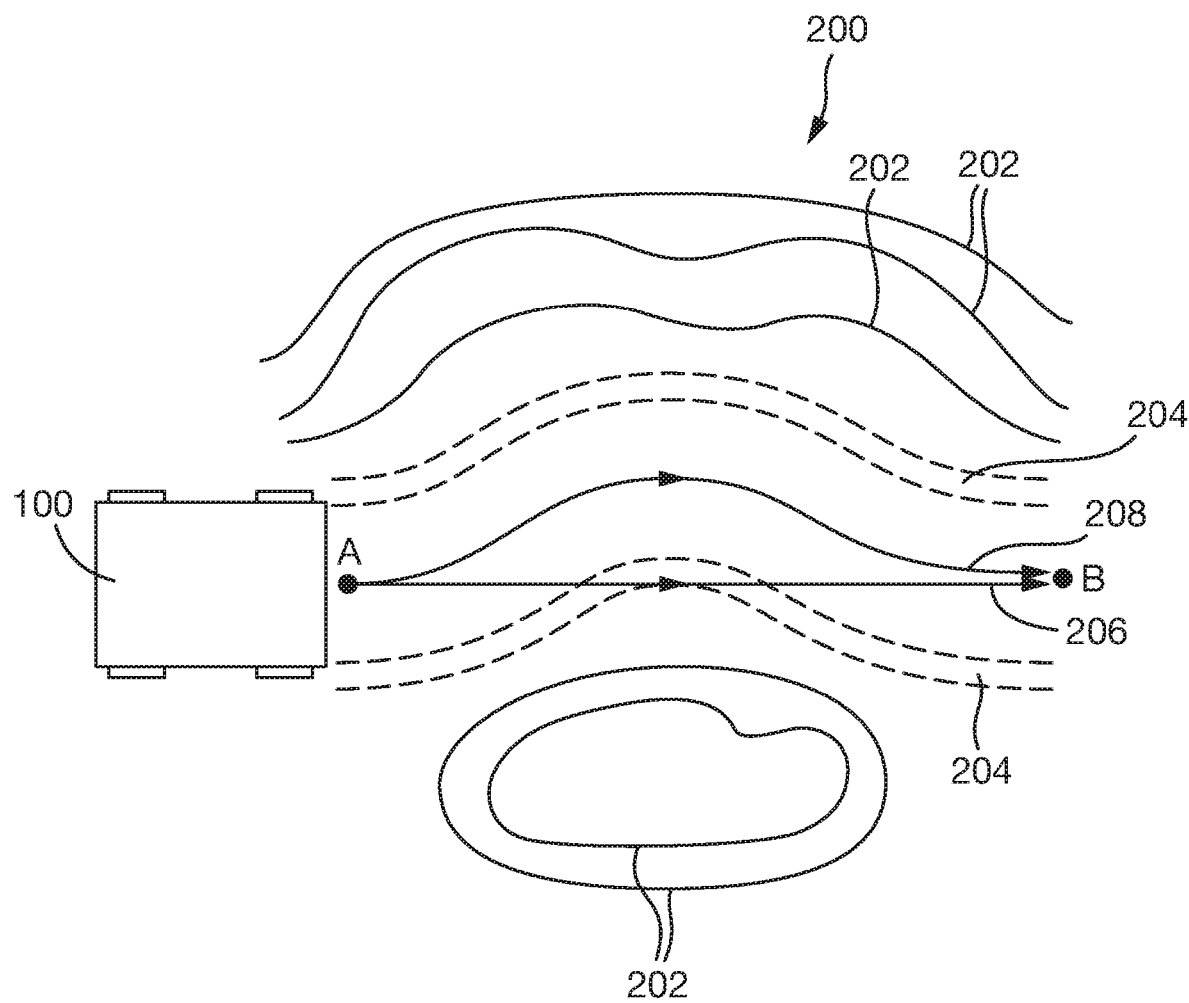

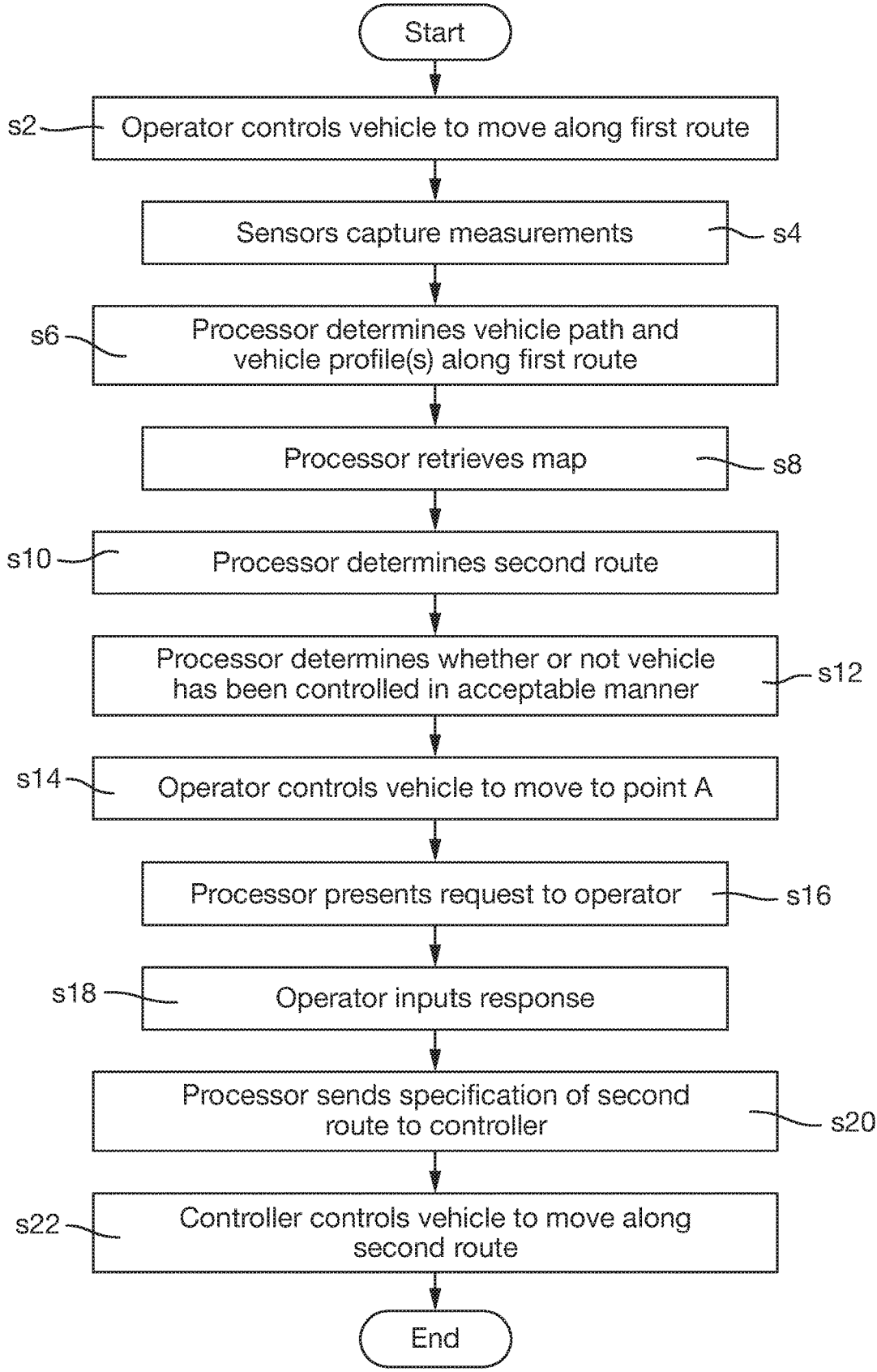

CONTROL OF AUTONOMOUS VEHICLES

FIELD OF THE INVENTION

The present invention relates to the control of vehicles, in particular those which have an autonomous mode.

BACKGROUND

Some vehicles are configured to operate in a manual mode or in an autonomous mode. The vehicle may be switched, e.g. by an operator, from operating in manual mode to operating in autonomous mode, and vice versa. In its manual mode, an operator of the vehicle exercises a relatively high degree of control over the movement of the vehicle. In its autonomous mode, the vehicle is capable of sensing its environment and navigating without human input.

Many vehicles include systems that enable the tracking and reporting of that vehicle's location and/or speed.

SUMMARY OF THE INVENTION

The present inventor has realised that current systems that enable the tracking of vehicle location and/or speed provide little or no real-time feedback to the vehicle's operator based upon the actual operation of the vehicle. The present inventor has realised that, if information relating to the vehicle's location and/or speed is relayed to the vehicle's operator, it can be used to reduce or eliminate undesirable vehicle operation. For example, operation that is dangerous or that is damaging to the vehicle may be reduced or eliminated.

The present inventor has realised that it is desirable for a vehicle to monitor operator behaviour and vehicle driving conditions to provide feedback (e.g. real-time feedback) to the operator. This may, for example, be used to provide training and mentoring to the operator in operation of the vehicle, and may be used to delineate desirable vehicle operation from undesirable vehicle operation. Also, aggressive operator behaviour and operator inattention may be detected and corrected, thereby improving operator and vehicle safety.

In a first aspect, the present invention provides a system for controlling a vehicle, the vehicle having an autonomous mode of operation. The system comprises: one or more sensors configured to measure one or more parameters associated with an operator controlling the vehicle to perform a first operation; and one or more processors configured to: determine that measurements taken by the one or more sensors fulfil one or more predetermined criteria; responsive to determining that the measurements taken by the one or more sensors fulfil the one or more predetermined criteria, determine a second operation for performance by the vehicle; and control the vehicle in the autonomous mode such that the vehicle performs the second operation.

The first operation may comprise the vehicle travelling along a first route between two points. The second operation may comprise the vehicle travelling along a second route between the two points. The second route may be different to the first route.

The second operation may comprise the vehicle travelling along the first route between the two points differently (e.g. at lower speed) to how the vehicle travelled along the first route during the first operation.

The one or more processors may be further configured to: using the measurements taken by the one or more sensors, determine a first route travelled by the vehicle during the first operation, the first route being between two points; determine a second route between the two points; compare the first route and the second route; and, based on the comparison between the first route and the second route, determine that the one or more sensors fulfil the one or more predetermined criteria.

The one or more processors may be configured to determine the second route between the two points using a map of an environment between the two points. The one or more sensors may be further configured to measure parameters associated with the environment between the two points. The one or more processors may be configured to generate the map using measurements taken by the one or more sensors of the parameters associated with the environment between the two points.

The one or more predetermined criteria may comprise one or more criteria that one or more sensor measurements exceed respective thresholds.

The one or more sensors may include one or more sensors selected from the group of sensors consisting of: a vehicle position sensor, an image sensor, a sensor configured to measure a state of a subsystem of the vehicle, a vehicle speed sensor, a vehicle acceleration sensor, an attitude sensor, and a force sensor.

The operator may be located on or in the vehicle.

The one or more processors may be configured to provide, to the operator, a notification that the one or more predetermined criteria have been fulfilled.

The one or more processors may be configured to, responsive to determining that the measurements taken by the one or more sensors fulfil the one or more predetermined criteria, provide, to the operator, a request that the vehicle be operated in the autonomous mode. The one or more processors may be configured to control the vehicle in the autonomous mode such that the vehicle performs the second operation only in response to receiving an acceptance of the request from the operator.

The vehicle may be a land-based vehicle.

In a further aspect, the present invention provides a vehicle having an autonomous mode of operation, the vehicle comprising a system according to any preceding aspect.

In a further aspect, the present invention provides a method for controlling a vehicle, the vehicle having an autonomous mode of operation. The method comprises: measuring, by one or more sensors, one or more parameters associated with an operator controlling the vehicle to perform a first operation; determining that measurements taken by the one or more sensors fulfil one or more predetermined criteria; responsive to determining that the measurements taken by the one or more sensors fulfil the one or more predetermined criteria, determining a second operation for performance by the vehicle; and controlling the vehicle in the autonomous mode such that the vehicle performs the second operation.

In a further aspect, the present invention provides a program or plurality of programs arranged such that when executed by a computer system or one or more processors it/they cause the computer system or the one or more processors to: receive sensor data comprising measurements of one or more parameters associated with an operator controlling a vehicle to perform a first operation; determine that measurements taken by the one or more sensors fulfil one or more predetermined criteria; responsive to determining that the measurements taken by the one or more sensors fulfil the one or more predetermined criteria, determine a second operation for performance by the vehicle; and control the vehicle in an autonomous mode such that the vehicle performs the second operation.

In a further aspect, the present invention provides a machine readable storage medium storing a program or at least one of the plurality of programs according to the preceding aspect.

BRIEF DESCRIPTION OF THE DRAWINGS

FIG. 2 is a schematic illustration (not to scale) showing an example scenario in which the vehicle operates; and FIG. 3 is a process flow chart showing certain steps of a process of operating the vehicle.

DETAILED DESCRIPTION

Figure 1:
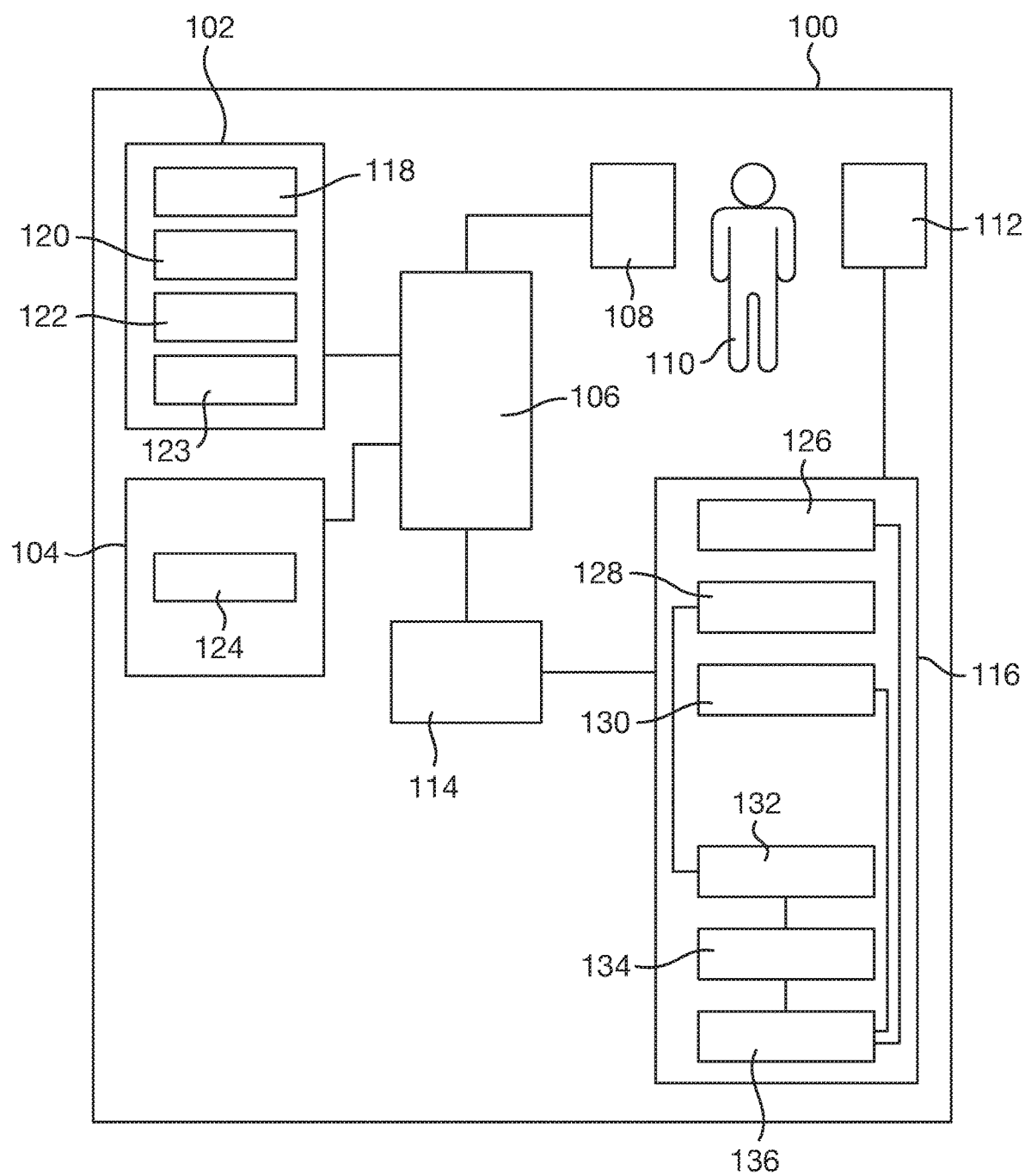
FIG. 1 is a schematic illustration (not to scale) of a vehicle.

FIG. 1 is a schematic illustration (not to scale) of an embodiment of a vehicle 100. In this embodiment, the vehicle 100 is a land-based vehicle configured to be controlled to move over land.

The vehicle 100 comprises a sensor system 102, a memory 104, a processor 106, an operator interface 108, an operator 110, operator controls 112, a controller 114, and vehicle subsystems 116.

The sensor system 102 comprises a plurality of sensors located on or in the vehicle 100. In this embodiment, the sensor system 102 includes, but is not limited to, a GPS receiver 118, a camera 120, a lidar sensor 122, and a plurality of vehicle subsystem sensors 123. The sensor system 102 is coupled to the processor 106 such that measurements taken by the sensors 118, 120, 122, 123 of the sensor system 102 may be sent from the sensor system 102 to the processor 106.

The GPS receiver 118 is configured to receive GPS satellite signals from GPS satellites. The GPS receiver 118 is configured to, using the received GPS satellite signals, calculate the geographical location of the vehicle 100. The GPS receiver 118 is configured to send the determined location of the vehicle 100 to the processor 106.

The camera 120 is a visible light detecting camera configured to capture visible light images of the vehicle's environment proximate to the vehicle 100, i.e. the vehicle's surroundings. The camera 120 may have a fixed orientation on the vehicle 100 (for example, the camera 120 may be a forward facing camera), or the camera 120 may be controlled to vary its facing with respect to the vehicle 100. In some embodiments, the vehicle 100 comprises multiple cameras, each having a different respective facing with respect to the vehicle 100. The camera 120 is configured to send the captured images to the processor 106.

The lidar sensor 122 is a range sensor configured to measure a distance between the vehicle 100 and objects within the vehicle's environment that are proximate to the vehicle 100. For example, the lidar sensor 122 may be arranged on the vehicle 100 to measure a separation between the vehicle 100 and objects in the path of the vehicle 100. Preferably, the lidar sensor 122 is a forward facing sensor on the vehicle 100. In some embodiments, the vehicle 100 comprises multiple lidar sensors, each having a different respective facing with respect to the vehicle 100. The vehicle 100 may include a rear facing lidar sensor. The lidar sensor 122 is configured to send the distance measurements to the processor 106.

The vehicle subsystem sensors 123 are configured to measure the state of the vehicle subsystems 116 during vehicle operation. For example, the vehicle subsystem sensors 123 may measure a position of one or more actuators that control a steering unit 126, a throttle 128, and/or a brake unit 130 of the vehicle subsystems 116. In some embodiments, the vehicle subsystem sensors 123 include one or more sensors for determining a current driving lane of the vehicle 100, a fuel level, a brake fluid level, or other appropriate parameter value. The vehicle subsystem sensors 123 are configured to send the measurements of the vehicle subsystems 116 to the processor 106.

The memory 104 is a computer memory which may be any read/write storage device such as a random access memory (RAM) or a non-volatile storage device. An example of a non-volatile storage device includes a disk or tape storage device. The memory 104 is coupled to the processor 106 such that information may be sent from the processor 106 to the memory 104, and stored by the memory 104. Also, the memory 104 is coupled to the processor 106 such that information stored in the memory 104 may be accessed or retrieved for use by the processor 106. In this embodiment, the memory 104 stores a map 124.

In this embodiment, the map 124 comprises a digital model of an environment in which the vehicle 100 operates. The map 124 may include a three-dimensional representation of a terrain's surface in a region in which the vehicle 100 is operating, i.e. a digital elevation model. The map 124 may be editable by the processor 106, for example, such that the processor 106 may modify or update the map 124.

The processor 106 is coupled to the sensor system 102 such that sensor measurements may be sent from the sensor system 102 to the processor 106. The processor 106 is configured to receive and process the sensor measurements, for example, as described in more detail later below with reference to FIG. 3. The processor 106 is further coupled to the memory 104 such that information may be stored in and retrieved from the memory 104 by the processor 106. The processor 106 is further coupled to the operator interface 108 such that information may be sent between the processor 106 and the operator interface 108. As described in more detail later below with reference to FIG. 3, in this embodiment, the processor 106 is configured to output information to the operator interface 108 for presentation to the operator 110. Also, the processor 106 is configured to receive an operator input from the operator interface 108, and to process the received operator input. The processor 106 is further coupled to the controller 114 such that the processor 106 may send control instructions to the controller 114, for example as described in more detail later below with reference to FIG. 3.

The operator interface 108 is an interface to devices for both input and output of data. The operator interface 108 is configured to present to the operator 110 information received from the processor 106. The operator interface 108 is further configured to receive an operator input from the operator 110, for example in response to information being presented to the operator 110, and to send the received operator input to the processor 106. Preferably, the operator interface 108 is an interface that can easily be used by the operator 110 while the operator 110 simultaneously controls the vehicle 100. Examples of appropriate operator interfaces include, but are not limited, a touchscreen display, and a voice-user interface.

The operator 110 is a human operator for the vehicle 100. The operator 110 is located on or in the vehicle 100. The operator 110 may control the operator controls 112 to control the vehicle 100.

The operator controls 112 are coupled to the vehicle subsystems 116 in such a way that the operator controls 112 control operation of the vehicle subsystems 116, thereby controlling the vehicle 116. Thus, by operating the operator controls 112, the operator 110 may control operation of the vehicle 100. Example operator controls 112 include, but are not limited to: a steering wheel; a joystick; various pedals including, for example, a throttle or accelerator pedal, a brake pedal, and a clutch pedal; a gear stick; signalling apparatus; and lighting apparatus.

Thus, the controller 114 is configured to cooperate with the processor 106 to provide for autonomous control of the vehicle 100. The controller 114 is configured to receive, from the processor 106, a processor output which may include instructions for controlling the vehicle 100. In addition to being coupled to the processor 106, the controller 114 is coupled to the vehicle subsystems 116. The controller 114 is further configured to, based on information received from the processor 106, generate control signals for controlling the vehicle subsystems 116. The controller 114 is configured to send the generated control signals to the vehicle subsystems 116, thus controlling operation of the vehicle subsystems 116, and thereby controlling the vehicle 100 in accordance with the instructions received from the processor 106.

The vehicle subsystems 116 include various subsystems that allow the vehicle 100 to operate. Accordingly, in this embodiment, the vehicle subsystems 116 include various subsystems including, but not limited to, a steering unit 126, a throttle 128, a brake unit 130, an engine 132, a transmission 134, and a plurality of wheels 136.

The engine 132 is configured to convert an energy source into mechanical energy. The engine 132 may be, for example, any combination of an internal combustion engine, an electric motor, steam engine, Stirling engine, or other types of engines and/or motors.

The transmission 134 comprises elements that are operable to transmit mechanical power from the engine 132 to the wheels 136. Accordingly, the transmission 134 may include a gearbox, clutch, differential, and drive shafts including axles coupled to the wheels 136.

The wheels 136 are configured to enable the vehicle 100 to move over land. The vehicle may include any number of wheels, for example, 4 or 6 wheels.

The steering unit 126 comprises any combination of mechanisms that are operable to adjust the heading of the vehicle 100. In this embodiment, the steering unit 126 is coupled to the wheels 136 and is configured to adjust the facing of the one or more wheels 136.

The throttle 128 is coupled to the engine 132 and is configured to control an operating speed of an engine 132, thereby to control the speed of the vehicle 100.

The brake unit 130 includes any combination of mechanisms configured to decelerate the vehicle 100. In this embodiment, the brake unit 136 is coupled to the wheels 136 and is configured to use friction to slow rotation of the wheels 136.

In this embodiment, the vehicle 100 is switchable between two different modes of operation, namely an autonomous mode and a manual mode.

In its autonomous mode, the vehicle 100 may control itself without human interaction. In this embodiment, in autonomous mode, the vehicle 100 is fully autonomous. The processor 106 may determine a current state of the vehicle 100 and its environment from measurements taken by the sensor system 102. Also, in autonomous mode, the processor 106 and controller 114 cooperate to control the vehicle 100 based on the vehicle and environment states. In autonomous mode, the processor 106 and controller 114 may control the vehicle 100 without human input, for example without a need for an input from the operator 110.

In its manual mode, the vehicle 100 is driven entirely by the operator 110, i.e. the operator 100 is entirely responsible for vehicle navigation. Nevertheless, in its manual mode, some functions of the vehicle 100 other than navigation may be performed by the processor 106 and/or the controller 114.

In some embodiments, the vehicle 100 may be operable in a semi-autonomous mode instead of or in addition to one or both of the autonomous mode and the manual mode. In semi-autonomous mode, the operator 110 and the controller 114 in combination navigate the vehicle 100.

Apparatus, including the processor 106, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

FIG. 2 is a schematic illustration (not to scale) showing an example scenario in which the vehicle 100 operates. A process of controlling the vehicle 100 in this scenario is described in more detail later below with reference to FIG. 3.

In this scenario, the vehicle 100 operates within an environment 200, and in particular travels over uneven ground (indicated by contour lines 202) between a first point A on the ground and a second point B on the ground. In this scenario, two ruts (each bounded by a respective pair of dotted lines and indicated in FIG. 2 by the reference numerals 204) have been formed in the ground between the first and second points A, B. The ruts 204 are depressions or grooves worn into the ground by the previous travel of wheeled vehicles, such as the vehicle 100. Routes travelled by the vehicle 100 between the first point A and the second point B are indicated in FIG. 2 by solid arrows and the reference numerals 206 and 208. The reference numeral 206 indicates a first route. The reference numeral 208 indicates a second route.

FIG. 3 is a process flow chart showing certain steps of a process of operating the vehicle 100, in the scenario of FIG. 2.

It should be noted that certain of the process steps depicted in the flowchart of FIG. 3 and described below may be omitted or such process steps may be performed in differing order to that presented above and shown in FIG. 3. Furthermore, although all the process steps have, for convenience and ease of understanding, been depicted as discrete temporally-sequential steps, nevertheless some of the process steps may in fact be performed simultaneously or at least overlapping to some extent temporally.

At step s2, using the operator controls 112, the operator 110 controls the vehicle 100 to travel within the environment 200, from the first point A to the second point B, along the first route 206. At step s2, the vehicle 100 operates in manual mode.

In this embodiment, the first route 206 is a route over the uneven ground that avoids the wheels 136 of the vehicle 100 travelling along the ruts 204. The first route 206 avoiding the ruts 204 means that the first route 206 is relatively bumpy. Thus, following the first route 206 may potentially damage the vehicle 100 (for example, a suspension system of the vehicle 100), may be uncomfortable for any passengers in the vehicle 100 (including the operator 110), and/or may risk the vehicle 100 overturning. In other words, in this embodiment, the first route 206 is an undesirable route through the environment 200 for the vehicle 100.

At step s4, while the vehicle 100 travels along the first route 206, the sensor system 102 takes sensor measurements.

In particular, the GPS receiver 118 continuously or periodically measures the vehicle's global position as it travels along the first route 206. Also, the camera 120 captures images of the environment 200 as the vehicle 100 travels along the first route 206. The camera 120 may capture two-dimensional images from a forward-looking view with respect to the vehicle 100. Also, the lidar sensor 122 captures range measurements of the vehicle's surroundings as the vehicle 100 travels along the first route 206.

Also, the vehicle subsystem sensors 123 continuously or periodically measure the state of the vehicle subsystems 116 as the vehicle 100 travels along the first route 206.

The measurement data captured by the sensors 118, 120, 122, 123 are sent to the processor 106, for example in real-time.

At step s6, using the measurements taken by the GPS receiver 118, the processor 106 determines the path taken by the vehicle at step s2, i.e. the processor 106 determines a specification for the first route 206.

Also, using the measurements taken by the camera 120 and the lidar sensor 122, the processor 106 detects the presence and location of obstacles (such as rocks, trees, other vehicles, etc.) within the environment 200 between the first and second points A, B.

Also, using the measurements taken by the vehicle subsystem sensors 123 and/or the GPS receiver 118, the processor 106 determines one or more performance profiles for the vehicle 100 describing how the vehicle 100 traverses the terrain between the first and second points A, B. For example, in some embodiments, the processor 106 determines a speed profile for the vehicle 100 which maps the vehicle's speed along the first route 206. In some embodiments, the processor 106 determines an acceleration profile for the vehicle 100 which maps the vehicle's acceleration along the first route 206. Other profiles recording other vehicle parameters may be calculated including, but not limited to, a braking profile and a throttle profile.

At step s8, the processor 106 retrieves the map 124 from the memory 104.

At step s10, using the map 124, the processor 106 determines a second route 208 within the environment 200, from the first point A to the second point B.

In some embodiments, the processor 106 determines the second route 208 only in response to one or more events occurring. Examples of such events include, but are not limited to: a passenger of the vehicle 100 (e.g. the operator 110) or another entity providing an indication to the processor 106 that the first route 204 was uncomfortable or otherwise undesirable; a sensor on the vehicle (e.g. a tilt sensor, which may be referred to as an attitude sensor) measuring that the vehicle 100 experienced a tilt angle above a threshold tilt angle; and a sensor on the vehicle (e.g. a force sensor, a suspension monitoring sensor, etc.) measuring that the vehicle suspension or other subsystem experienced undesirable conditions.

In some embodiments, the processor 106 determines the second route 208 as an optimum route between the first and second points A, B relative one or more predefined conditions. For example, the processor 106 may determine, as the second route 208: the route between the first and second points A, B that minimises the tilt angle experienced by the vehicle 100; the least bumpy route between the first and second point A, B; the shortest route between the first and second point A, B; or the most fuel-efficient route between the first and second point A, B. Any appropriate optimisation algorithm may be implemented by the processor 106 to determine the second route 208.

In some embodiments, the map 124 specifies the surface of the terrain between the first and second points A, B. The processor 206 may determine the second route 208 based on the terrain surface specified by the map 124.

In this embodiment, the determined second route 208 follows the ruts 204 between the first and second points A, B. In other words, were the vehicle 100 to follow the determined second route 208, the wheels 136 of the vehicle 100 would travel along the ruts 124.

In some embodiments, the map 124 specifies the location of the ruts 204 on the ground between the first and second points A, B. In such embodiments, the processor 106 may determine the second route 208 directly from the map 124, for example, without using sensor measurements captured by the sensor system 102.

In some embodiments, the processor 106 detects the presence and the locations the ruts 204 on the ground based on measurements taken by the camera 120 and/or the lidar sensor 122. For example, an object detection process may be performed on the images captured by the camera 120 to detect the ruts 204 between the first and second points A, B.

In some embodiments, the processor 106 detects the presence and location of obstacles (such as rocks, trees, other vehicles, etc.) within the environment based on measurements taken by the camera 120 and/or the lidar sensor 122. The processor 106 may determine the second route 208 so as to avoid collision of the vehicle 100 with the detected obstacles. In some embodiments, the processor 106 updates the map 124 to include the detected obstacles.

At step s12, the processor 102 determines whether or not the vehicle 100 moving along the first route 206 (at step s2) constitutes acceptable vehicle operation.

In this embodiment, step s12 comprises the processor 106 comparing the specification of the first route 206 (calculated at step s6) to the determined second route 208. The processor 106 compares the first and second routes 206, 208 to determine whether or not the first and second route 206, 208 differ significantly. Any appropriate criteria may be used to assess whether or not the routes 206, 208 differ significantly. For example, in some embodiments, the first and second routes 206, 208 are determined to differ significantly only if a distance between corresponding points along those routes 206, 208 exceeds a threshold distance value.

Also, in this embodiment, step s12 comprises the processor 106 assessing the one or more performance profiles (calculated at step s6), for example, by comparing them against one or more criteria, thresholds, and/or desired vehicle profiles. For example, the processor 106 may compare a determined speed profile for the vehicle 100 against a speed threshold to determine whether or not the vehicle 100 exceeded a speed limit.

In this embodiment, for the purposes of illustration, it is assumed that the processor 106 determines that the first and second routes 206, 208 differ significantly. The first and second routes 206, 208 differing significantly corresponds to the vehicle 100 being navigated between the first and second points A, B in an undesirable manner. In other words, by determining that the first and second routes 106, 208 differ significantly, the processor 106 determines the vehicle was operated in an unacceptable manner.

In some embodiments, the processor 106 may determine that one or more of the performance profiles for the vehicle 100 indicates that the vehicle 100 has been controlled between the first and second points A, B in an unacceptable manner, for example, too fast, too slow, inefficiently, etc.

As explained in more detail later below at step s16, in response to determining that the vehicle was operated in an unacceptable manner, the processor 106 will provide, to the operator 110, a request to take control of the vehicle operation.

In some embodiments, the processor 106 may provide feedback (e.g. in real-time) to the operator 110 regarding their unsatisfactory control of the vehicle 100. This feedback may be provided using the operator interface 108. This feedback may, for example, be in the form of a visual display and/or audio signal.

However, in other cases, the processor 106 may determine that the vehicle 100 was operated in an acceptable manner, for example by determining that the first and second routes 206, 208 do not differ significantly. In some embodiments, in response to determining that the vehicle 100 was operated in an acceptable manner, the processor 106 takes no action (i.e. it does not request to take control of the vehicle operation), and/or provides feedback to the operator 110 regarding their acceptable performance.

At step s14, using the operator controls 112, the operator 110 controls the vehicle 100 to return to the first point A.

At step s16, the processor detects that the vehicle 100 has been returned to the first point A (for example, based on GPS measurements received from the GPS receiver 118), and, in response, presents a request to the operator 110. The request is presented to the operator 110 using the operator interface 108.

In this embodiment, the request presented to the operator 110 is a request that the vehicle 100 be switched from manual mode into autonomous mode.

In some embodiments, the request is only presented to the operator 100 if, at step s12, the processor 106 determines that control of the vehicle 100 by the operator 110 along the first route 206 was unacceptable. In some embodiments, if, at step s12, the processor 106 determined that the operator 110 controlled the vehicle 100 in an acceptable manner, no request is presented to the operator 110 and the operator 110 may continue to control the vehicle 100 uninterrupted.

At step s18, the operator 110 inputs a response to the presented request into the operator interface 108. In this embodiment, the operator 110 may input one of two different responses. A first possible response that may be input by the operator 110 specifies that the vehicle 100 should be switched into autonomous mode. A second possible response that may be input by the operator 110 specifies that the vehicle 100 should not be switched into autonomous mode.

For illustration purposes, in this embodiment, the response provided by the operator 110 at step s18 switches the vehicle 100 into autonomous mode. However, in some situations, the operator 110 may decline the request to switch the vehicle 100 into autonomous mode, and may instead maintain manual control of the vehicle 100.

At step s20, responsive to the vehicle 100 being switched to autonomous mode, the processor 106 sends a specification of the determined second route 208 to the controller 114. In some embodiments, the processor 106 may disable the operator controls 112 in response to the vehicle 100 being switched into autonomous mode.

At step s22, the controller 114 controls the vehicle subsystems 116 in accordance with the information received from the processor 106, thereby controlling the vehicle 100 to travel within the environment 200, from the first point A to the second point B, along the second route 208.

In particular, in this embodiment, the controller 114 generates control signals for the vehicle subsystems 116 based on the received specification of the second route 208. The control signals are then sent from the controller 114 to the vehicle subsystems 116 to control the vehicle subsystems 116 so as to cause the vehicle 100 to follow the second route 208.

During autonomous navigation along the second route 208, the processor 106 may detect the presence and location of obstacles (such as rocks, trees, other vehicles, etc.) within the environment 200 based on measurements taken by the camera 120 and/or the lidar sensor 122. The processor 106 and controller 114 may operate to control the vehicle 100 to avoid collision with the detected obstacles. In some embodiments, the processor 106 updates the map 124 to include the detected obstacles.

The operator 100 is located within the vehicle 100 as the vehicle 100 navigates autonomously along the second route 208. Thus, the vehicle 100 demonstrates to the operator 110 preferred operation of the vehicle 100 between the first and second points A, B. In other words, the operator 110 receives training on how best to navigate the vehicle 100 in the environment 200.

After autonomous navigation along the second route 208, the vehicle 100 may be switched back into manual mode, and the process of FIG. 3 may be iteratively repeated one or more times. At each iteration, the operator 110 may navigate the vehicle 100 taking into account of the demonstration(s) provided by the vehicle 100 during the previous iteration(s).

Thus, a process of operating the vehicle 100 is provided.

Advantageously, the vehicle monitors operator driving behaviour and vehicle driving conditions to provide feedback (e.g. real-time feedback) to the operator. The vehicle tends to inform the operator when they are performing a manoeuvre in an unsafe or non-optimal way. Providing real-time feedback to the operator advantageously tends to facilitate the operator associating the feedback with particular manoeuvres, thus facilitating the operator in correcting their behaviour.

The above described system and method may be used to train and mentor the operator in the preferred operation of the vehicle, thereby reducing the likelihood of damage to the vehicle and improving safety for the operator, vehicle passengers, and users of other vehicles. Training of a human operator using an autonomous vehicle tends to be contrary to the conventional purpose of autonomous vehicles, which usually aim to eliminate a need for a human operator.

The above described system and method tend to be particularly useful at providing training to operators that are inexperienced at operating the vehicle.

Advantageously, the above described system and method tend to be implementable on existing autonomous or semi-autonomous vehicles.

The above described vehicle tends to perform the role of a human instructor. The vehicle may suggest to the operator a correct way to perform a particular manoeuvre and/or teach the operator how to drive a path that has been previously mapped more smoothly or quickly. A need for a human instructor tends to be reduced or eliminated.

In the above embodiments, the vehicle is a land-based vehicle configured to be controlled to move over land. For example, the vehicle may be a car, a truck, a motorcycle, a bus, etc. However, in other embodiments, the vehicle is a different type of vehicle. For example, in some embodiments, the vehicle is a different type of land-based vehicle such as a tracked vehicle, e.g., a tank. In some embodiments, the vehicle is an aircraft, such as an aeroplane or a helicopter. In some embodiments, the vehicle is a water-based vehicle such as a boat.

In the above embodiments, the sensor system is located on the vehicle. However, in other embodiments, one or more of the sensors of the sensor system is remote from the vehicle.

In the above embodiments, the processor is located on the vehicle. However, in other embodiments, some or all of the processor is remote from the vehicle. For example, the processor may be distributed across multiple different entities.

In the above embodiments, the memory is located on the vehicle. However, in other embodiments, the memory is remote from the vehicle.

In the above embodiments, the operator, the operator interface, and the operator controls are located on board the vehicle. However, in other embodiments, the operator, the operator interface, and the operator controls are located remotely from the vehicle. The vehicle may be an unmanned vehicle, such as an unmanned air vehicle (UAV).

In the above embodiments, the camera and the lidar sensor measure a state of the vehicle's surroundings. In some embodiments, one or more other sensors instead of or in addition to the camera and the lidar sensor measure the environment in which the vehicle operates. For example, a temperature sensor may measure a temperature of the environment, e.g. to detect icy conditions, and/or a light sensor may be used to assess visibility. Appropriate routes may be suggested and/or demonstrated to the operator depending upon the measured environmental conditions.

In the above embodiments, a map is stored on the vehicle. However, in other embodiments, a map is not stored on the vehicle. In some embodiments, the vehicle constructs a map of its environment based on sensor data collected as it moves around its environment. In some embodiments, the vehicle acquires the map from an entity remote from the vehicle. For example, in some embodiments, responsive to detecting undesirable vehicle operation (e.g. exceeding a speed limit), the vehicle may download a map of the area in which the undesirable operation took place, and determine a preferred operation using the downloaded map. This preferred operation may subsequently be presented or demonstrated to the operator.

In the above embodiments, initially the operator controls the vehicle along the first route. Subsequently, and in response to detecting undesirable vehicle operation, the vehicle autonomously navigates along a different route to demonstrate to the operator more preferable vehicle operation. However, in other embodiments, a different process is performed. For example, in some embodiments, no autonomous navigation takes place, and instead only feedback on the operator's performance is presented to the operator. In some embodiments, the vehicle may firstly autonomously navigate through the environment to demonstrate to the operator preferred operation. On subsequent passes through the environment, control of the vehicle may be handed over to the operator, for example, gradually by starting with shorter, easier segments before allowing the operator to perform more complex tasks.

In some embodiments, the vehicle additionally includes a transmitter. The processor may, using the transmitter, transmit details of undesirable vehicle operation to an entity remote from the vehicle, for example to a shared service configured to collect this information and to group operators with similar operators. This could be used to enable the vehicle processing system to request taking control of the vehicle before it reaches a situation where similar operators perform sub-optimally.

The invention claimed is:

1. A system for controlling a vehicle, the vehicle having an autonomous mode of operation and a manual mode of operation, the system comprising:
   one or more sensors configured to measure one or more parameters associated with an operator controlling the vehicle to perform a first operation, the first operation comprising the vehicle travelling along a first route between a first point and a second point; and
   one or more processors configured to perform a process, the process comprising
      operating in the manual mode as the operator controls the vehicle to perform the first operation;
      determining a second route between the first point and the second point, the second route being different from the first route;
      comparing the first route and the second route;
      determining, based on the comparison between the first route and the second route, that measurements taken by the one or more sensors fulfil one or more predetermined criteria;
      determining, responsive to determining that the measurements taken by the one or more sensors fulfil the one or more predetermined criteria, a second operation for performance by the vehicle, the second operation comprising the vehicle travelling along the second route between the first point and the second point;
      operating in the manual mode as the operator controls the vehicle to return to the first point;
      generating, responsive to detecting that the vehicle has returned to the first point, a request to control the vehicle in the autonomous mode such that the vehicle performs the second operation; and
      causing presentation, via an operator interface, of the request.

2. The system according to claim 1, wherein the one or more processors are configured to determine the second route between the first and second points using a map of an environment between the first and second points.

3. The system according to claim 2, wherein:
   the one or more sensors are configured to measure parameters associated with the environment between the first and second points; and
   the one or more processors are configured to generate the map using measurements taken by the one or more sensors of the parameters associated with the environment between the first and second points.

4. The system according to claim 1, wherein the one or more predetermined criteria comprise one or more criteria that one or more sensor measurements exceed respective thresholds.

5. The system according to claim 1, wherein the one or more sensors include a vehicle position sensor, an image sensor, a sensor configured to measure a state of a subsystem of the vehicle, a vehicle speed sensor, a vehicle acceleration sensor, a vehicle attitude sensor, and/or a force sensor.

6. The system according to claim 1, wherein the operator and the operator interface are located on or in the vehicle.

7. The system according to claim 1, wherein the one or more processors are configured to cause presentation, via the operator interface, of a notification that the one or more predetermined criteria have been fulfilled.

8. The system according to claim 1, wherein the one or more processors are configured to:
in response to receiving an input indicating acceptance of the request from the operator, control the vehicle in the autonomous mode such that the vehicle performs the second operation.

9. The system according to claim 1, wherein the vehicle is a land-based vehicle.

10. The system according to claim 1, wherein determining the second route between the first point and the second point occurs in response to at least one event, the at least one event including
an indication from the operator to the one or more processors that the first route was undesirable during the first operation,
an attitude sensor on the vehicle measuring that the vehicle experienced a tilt angle above a threshold tilt angle during the first operation, and/or
a force sensor on the vehicle measuring that a vehicle suspension or other vehicle subsystem exceeded a threshold force during the first operation.

11. A method for controlling a vehicle, the vehicle having an autonomous mode of operation, the method comprising:
measuring, by one or more sensors, one or more parameters associated with an operator controlling the vehicle to perform a first operation, the first operation comprising the vehicle travelling along a first route between a first point and a second point;
operating in the manual mode as the operator controls the vehicle to perform the first operation;
determining a second route between the first point and the second point, the second route being different from the first route;
comparing the first route and the second route;
determining, based on the comparison between the first route and the second route, that measurements taken by the one or more sensors fulfil one or more predetermined criteria;
determining, responsive to determining that the measurements taken by the one or more sensors fulfil the one or more predetermined criteria, a second operation for performance by the vehicle, the second operation comprising the vehicle travelling along the second route between the first point and the second point;
operating in the manual mode as the operator controls the vehicle to return to the first point;
generating, responsive to detecting that the vehicle has returned to the first point, a request to control the vehicle in the autonomous mode such that the vehicle performs the second operation;
causing presentation, via an operator interface, of the request; and
in response to receiving an input indicating acceptance of the request, controlling the vehicle in the autonomous mode such that the vehicle performs the second operation.

12. The method according to claim 11, wherein determining the second route between the first and second points is carried out using a map of an environment between the first and second points, and includes:
measuring parameters associated with the environment between the first and second points; and
generating the map using measurements taken by the one or more sensors of the parameters associated with the environment between the first and second points.

13. A computer program product comprising one or more non-transitory machine readable mediums encoded with instructions that when executed by one or more processors cause a process to be carried out for controlling a vehicle, the vehicle having an autonomous mode of operation and one or more sensors, the process comprising:
receiving sensor data taken by the one or more sensors, the sensor data comprising measurements of one or more parameters associated with an operator controlling the vehicle to perform a first operation, the first operation comprising the vehicle travelling along a first route between a first point and a second point;
operating in the manual mode as the operator controls the vehicle to perform the first operation;
determining a second route between the first point and the second point, the second route being different from the first route;
comparing the first route and the second route;
determining, based on the comparison between the first route and the second route, that the measurements taken by the one or more sensors fulfil one or more predetermined criteria;
determining, responsive to determining that the measurements taken by the one or more sensors fulfil the one or more predetermined criteria, a second operation for performance by the vehicle, the second operation comprising the vehicle travelling along the second route between the first point and the second point;
operating in the manual mode as the operator controls the vehicle to return to the first point;
if the measurements taken by the one or more sensors do not fulfil the one or more predetermined criteria, generating, responsive to detecting that the vehicle has returned to the first point, a request to control the vehicle in the autonomous mode such that the vehicle performs the second operation; and
causing presentation, via an operator interface, of the request.

14. The computer program product according to claim 13, wherein determining that the measurements taken by the one or more sensors fulfil the one or more predetermined criteria includes
determining the first route using the measurements taken by the one or more sensors.

15. The computer program product according to claim 13, wherein determining the second route between the first and second points is carried out using a map of an environment between the first and second points, and includes:
measuring parameters associated with the environment between the first and second points; and
generating the map using measurements taken by the one or more sensors of the parameters associated with the environment between the first and second points.

16. The computer program product according to claim 13, wherein the vehicle is a land-based vehicle.

* * * * *